United States Patent
Lebrun et al.

[11] Patent Number: 6,108,568
[45] Date of Patent: Aug. 22, 2000

[54] CORDLESS TELEPHONY DEVICE RECHARGEABLE IN ANY POSITION

[75] Inventors: Jean-Pierre Lebrun, Roeze Sarthe; Marcel Pinel, Le Mans, both of France

[73] Assignee: U.S. Philips Corporation, New York, N.Y.

[21] Appl. No.: 08/984,213

[22] Filed: Dec. 3, 1997

[30] Foreign Application Priority Data

Dec. 6, 1996 [FR] France .................................. 96 15048

[51] Int. Cl.⁷ .............................. H04Q 7/00; H04M 1/00
[52] U.S. Cl. ........................ 455/573; 455/568; 379/435; 320/103; 320/110; 320/111
[58] Field of Search ............................ 455/90, 573, 572, 455/462, 127, 410, 568, 574; 379/435; 320/110, 113, 114, 115, 163; 439/626

[56] References Cited

U.S. PATENT DOCUMENTS

| | | | |
|---|---|---|---|
| 4,458,111 | 7/1984 | Sugihara | 455/573 |
| 4,882,745 | 11/1989 | Silver | 455/568 |
| 5,122,721 | 6/1992 | Okada et al. | 320/111 |
| 5,256,955 | 10/1993 | Tomura et al. | 320/110 |
| 5,343,136 | 8/1994 | Yamaguchi et al. | 320/103 |
| 5,479,486 | 12/1995 | Saji | 455/573 |
| 5,519,776 | 5/1996 | Kodama | 379/435 |

OTHER PUBLICATIONS

AT&T User Manual For Cordless Telephone, 848233938 Issue 1 AT&T, 1998.

*Primary Examiner*—Wellington Chin
*Assistant Examiner*—Isaak R. Jama
*Attorney, Agent, or Firm*—Dicran Halajian

[57] ABSTRACT

A cordless telephone is disclosed having a handset and a receptacle. The receptacle has a shape which adapts itself to the shapes of the front and back faces of the handset. The receptacle shape matches and completely contacts the shape of the handset back face. A fixing stop of the charger supports two receptacle charge contacts of the handset.

10 Claims, 4 Drawing Sheets

CORDLESS TELEPHONY DEVICE RECHARGEABLE IN ANY POSITION

FIELD OF THE INVENTION

The present invention relates to a cordless telephony device comprising at least:
- a receptacle which allows of taking up a position between a minimum and a maximum relative to the vertical, and which has a fixing stop and two receptacle charge contacts,
- a handset which has a front face, a back face, a base and handset charge contacts, and which allows of being accommodated in said receptacle in a front face forward or front face backward position.

The invention also relates to a receptacle and a handset.

BACKGROUND OF THE INVENTION

Such a cordless telephony device is notably described in U.S. Pat. No. 5,519,776 of May 21, 1996.

The telephony device described in that document has a structure which permits positioning the receptacle in a horizontal or vertical position, and allows recharging of the handset whether it is placed in the receptacle in a front face forward or front face backward position.

Therefore, as indicated in FIG. 1, the proposed handset 1 has two pairs of notches 10 and 11 which are located on the side walls of the handset both on its front face and on its back face. A charge contact of the handset referenced 12 or 13 is positioned at the bottom of each notch. And a lug 14 is provided on each of the inside side walls of the receptacle 2. These lugs form charge contacts of the receptacle and they are intended to be placed in the notches of the handset when the handset is in its place in the receptacle.

These lugs at the same time ensure a mechanical connection between the handset and the receptacle. It is thus possible to attach the receptacle to a wall and to ensure that the handset is fixed in the front face forward and backward positions.

The solution described in that Patent has the drawback of being relatively costly and complex to manufacture and it requires the provision of four charge contacts on the handset. Moreover, it is constraining from an aesthetic point of view.

The invention notably has for its object to propose a solution that does not have these drawbacks.

SUMMARY OF THE INVENTION

Therefore, a cordless telephony device according to the invention and as described in the opening paragraph is characterized in that:
- said receptacle has a shape which adapts itself to the shapes of the front and back faces of the handset,
- said handset has two handset charge contacts which are supported by said base, the two receptacle charge contacts being supported by said fixing stop,
- while said handset and/or said receptacle comprises means for ensuring a correct biasing of the contacts under consideration whatever the position of the handset in the receptacle,
- said receptacle comprises fastening means for determining said minimum position.

Thus, the invention notably permits to avoid the use of mechanical connection means for connecting the handset to the receptacle, all this ensuring that the handset is fixed when the receptacle is in a minimum position relative to the vertical.

According to a first interesting variant of the invention, the base of said handset has a form that permits of putting said handset directly on its base on a horizontal support.

And, according to a second variant, the base of said handset has a form that permits of putting said handset on its base in a support with contours that match the form of said base.

These two variants permit of proposing an apparatus that presents to the user all the natural positions in which the handset rests or is charged: desktop position or wall position, horizontal or vertical position, front face forward or front face backward. These various positions are represented by way of example in the FIGS. 2a to 2f.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENTS

Figure 2:
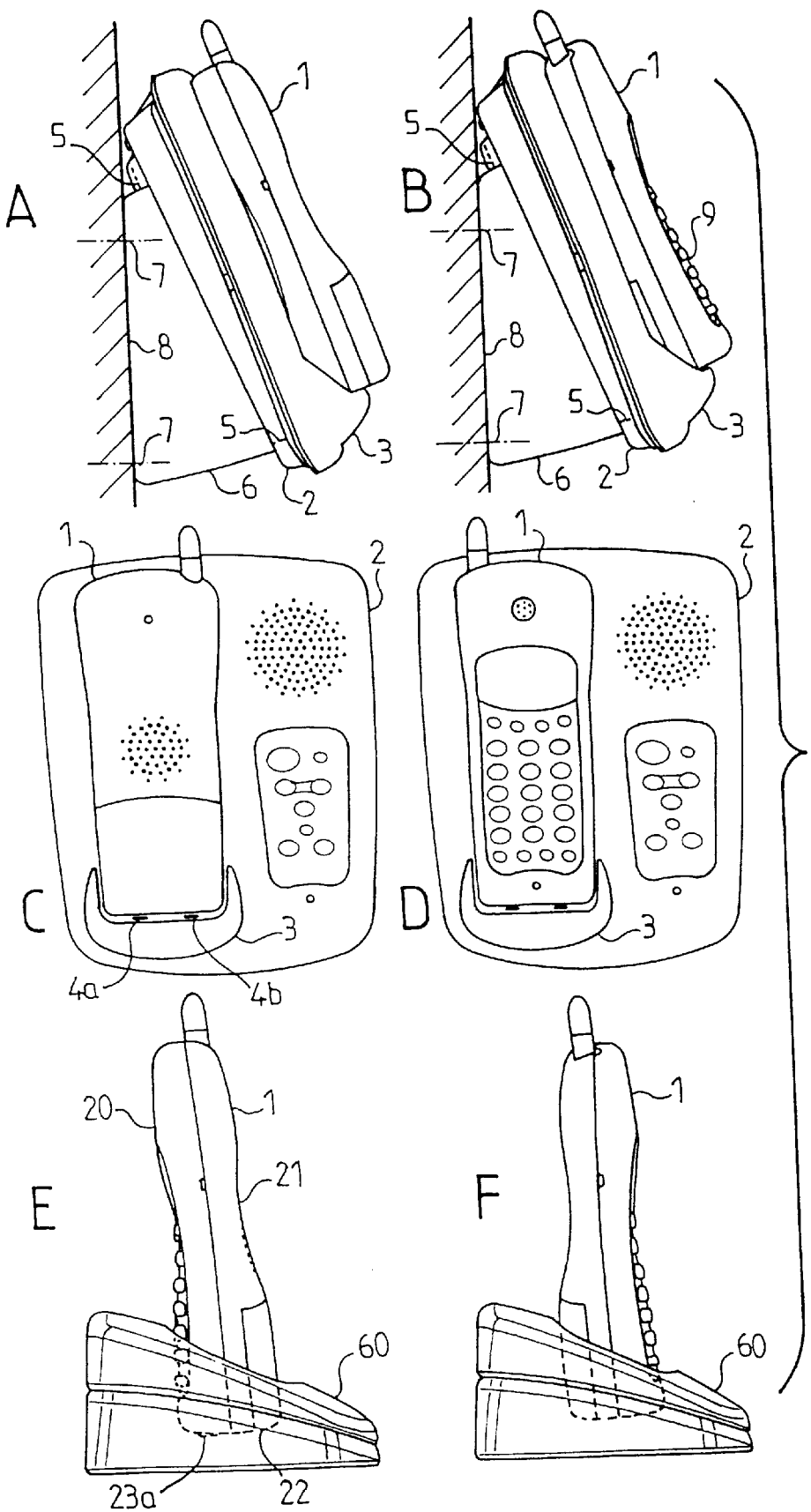
FIGS. 2a to 2f represent various elevations of a cordless telephony device according to the invention in various positions.
Figure 3:
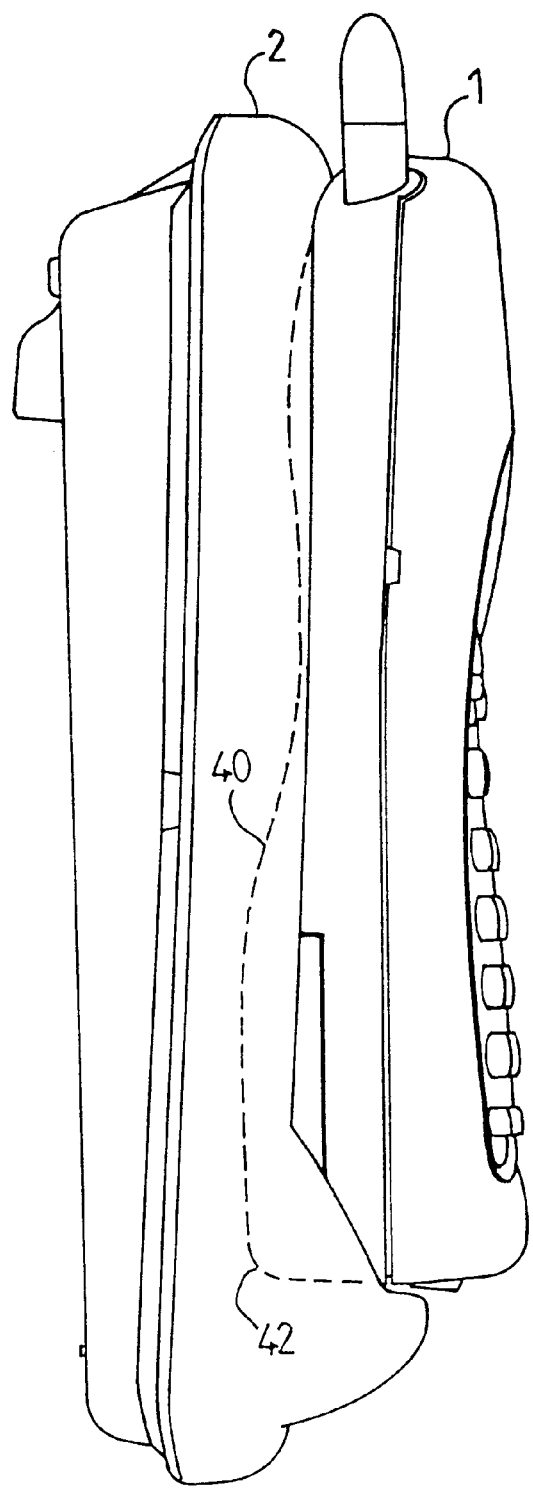
FIG. 3 represents an elevational view of a telephony device according to the invention when the handset rests in the receptacle in a front face forward position.
Figure 4:
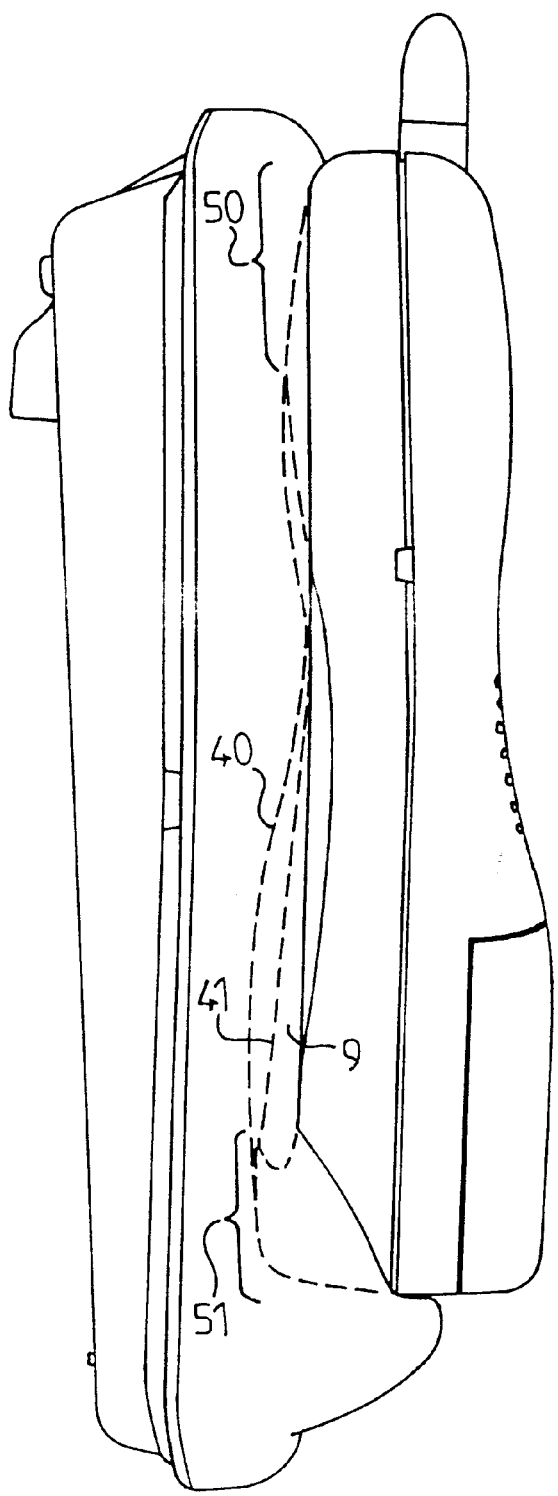
FIG. 4 represents an elevational view of a telephony device according to the invention when the handset rests in the receptacle in a position front face backward.

A telephony device according to the invention is represented in various positions in the FIGS. 2a to 2f and in the FIGS. 3 and 4. This telephony device comprises a handset 1 and a receptacle 2. The receptacle 2 comprises a fixing stop 3 which supports two charge contacts 4a and 4b called receptacle charge contacts.

The telephony device allows of taking up the position between a minimum and a maximum relative to the vertical. Fastening means 5 are provided for determining said minimum position. In the embodiment described here by way of example, these fastening means are formed by notches 5 located on the back face of the receptacle into which lugs of an adapter 6 are plugged which adapter allows of being fastened to a support 7 at two fastening points 8. These fastening means permit imposing a minimum position of the receptacle of 20° relative to the vertical, the maximum position of the receptacle being formed by the horizontal.

The handset 1 of the telephony device according to the invention has a keyboard 9 and has a front face 20, a back face 21, a base 22 and charge contacts 23a and 23b called handset charge contacts. The handset charge contacts are supported by the base 22 of the handset. The handset 1 is accommodated in said receptacle in a front face forward or front face backward position, the handset charge contacts and the receptacle charge contacts being situated opposite each other in the two cases.

Figure 1:
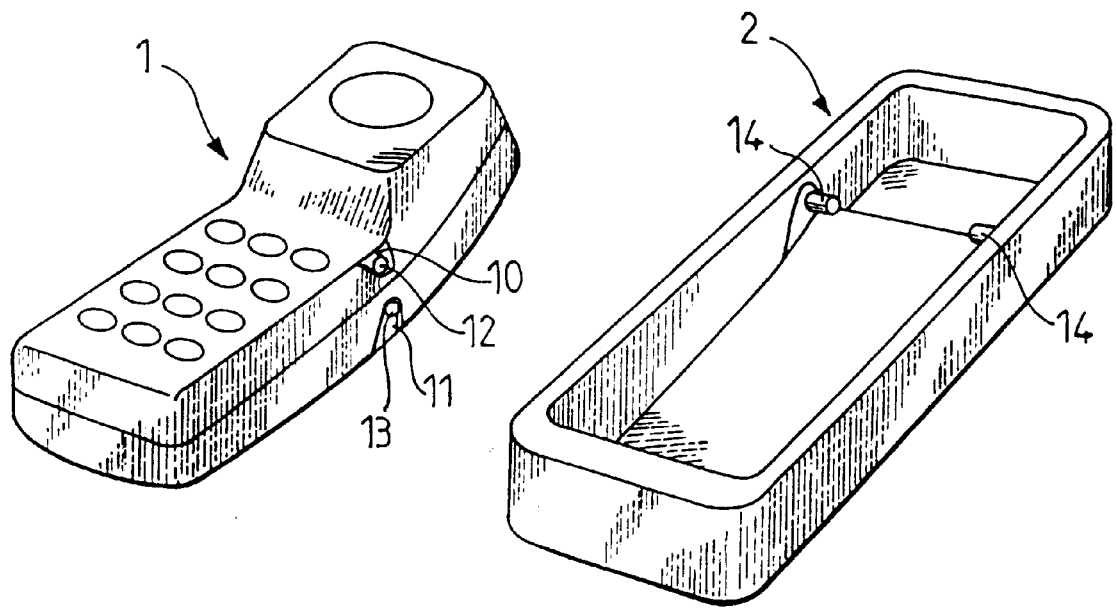
FIG. 1 represents a prior-art cordless telephony device.
Figure 5:
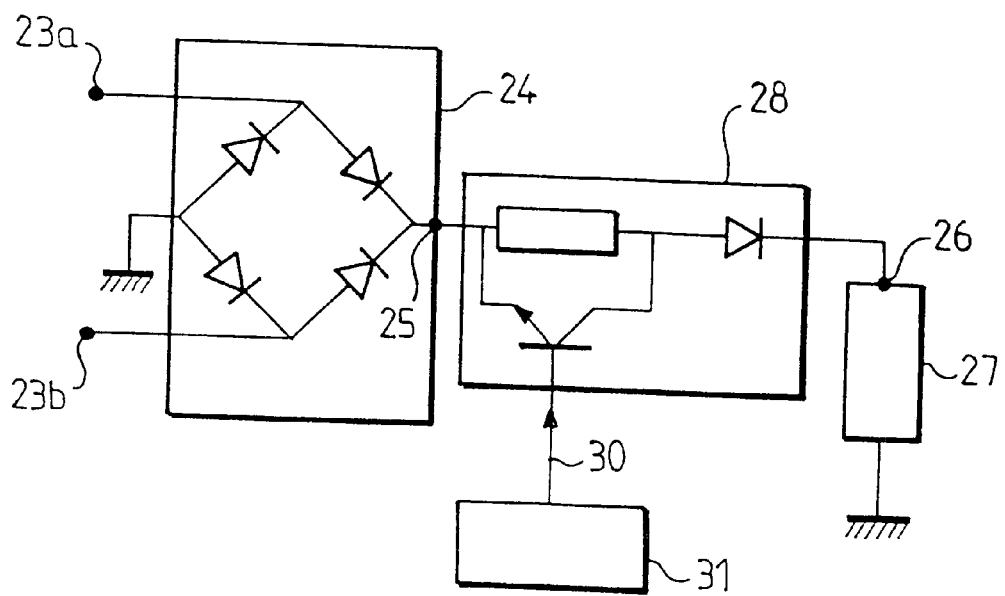
FIG. 5 represents a battery charging circuit used in a handset according to the invention.

In order to ensure a correct biasing of the contacts in whatever position of the handset in the receptacle, the handset charge contacts are connected to a rectifier bridge as is shown in FIG. 5. According to FIG. 5 a handset according to the invention contains a battery charging circuit which comprises a rectifier bridge 24 connected to the two charge contacts 23a and 23b. The output 25 of the rectifier bridge 24 is connected to the positive pole 26 of the battery 27 of the handset via a control circuit 28 which takes the respective levels of the potentials at points 25 and 26 into account, as well as the charging commands 30 given by a microprocessor 31 accommodated in said handset. In another embodiment it is possible to place the rectifier bridge in the receptacle instead of placing same in the handset.

Finally, as this appears from the FIGS. 3 and 4, the receptacle 2 has a shape 40 which matches the shapes 41 and 42 of the front and back faces of the handset.

In the embodiment which has here been described by way of example, the shape 40 of the receptacle and the shape 42 of the back face of the handset are identical, so that, when the handset is in its place in the receptacle, front face forward (FIG. 2b), the receptacle completely surrounds the handset. On the other hand, the shape 40 of the receptacle and the front shape 41 of the handset have similar forms but they are different. Thus, when the handset is in its place in the receptacle, front face backward, the keyboard 9 of the handset does not rest on the receptacle. The fixing of the handset is ensured by two contact surfaces 50 and 51 located at the ends of the handset.

Advantageously, the base 22 of the handset is sufficiently flat, so that it the form of said base. Advantageously, these contours are chosen such that the handset 1 can rest in the support 60 in the front face forward or front face backward position. As this is shown in FIGS. 2e to 2f, the support 60 is, for example, a charger which may be placed on a desk or mounted on a wall.

The invention is not restricted to the embodiments that have just been described. More particularly, other forms are likely to be used for the receptacle and for the handset. For example, it is not necessary for the shape of the handset and that of the receptacle to match in the manner that has been described by way of example. It is sufficient for the shapes to have sufficient contact surfaces available so as to ensure that the handset is fixed in the receptacle.

What is claimed is:

1. A cordless telephony device comprising:
    a receptacle which is positionable between a minimum position and a maximum position relative to the vertical, and which has a fixing stop and two receptacle charge contacts,
    a handset which has a front face, a back face, a base and handset charge contacts, and which is accommodateable in said receptacle in a front face forward or front face backward position,
    said receptacle having a receptacle shape which adapts to the shapes of the front and back faces of the handset, wherein said receptacle shape matches and completely contacts the shape of the back face,
    said handset having two handset charge contacts which are supported by said base, the two receptacle charge contacts being supported by said fixing stop,
    wherein at least one of said handset and said receptacle includes means for ensuring a correct biasing between the handset charge contacts and the receptacle charge contacts, and
    said receptacle includes fastening means for determining said minimum position.

2. The telephony device as claimed in claim 1, wherein said fastening means have notches (6) intended to fix an adapter (6) to be mounted on a wall.

3. A telephony device as claimed in claim 1, wherein said means for ensuring a correct biasing of the contacts opposite each other comprise a rectifier bridge.

4. A cordless telephony device as claimed in claim 1, wherein the base of said handset has a form that permits of putting said handset directly on its base on a horizontal support.

5. A cordless telephony device as claimed in claim 1, wherein the base of said handset has a form that permits of putting said handset on its base in a support that has contours that match the form of said base.

6. A telephone handset and receptacle:
    which has a front face, a back face, a base and handset charge contacts, said handset being accommodated in the receptacle in a front face forward or front face backward position, said receptacle being positionable between a minimum position and a maximum position relative to the vertical and having receptacle charge contacts,
    said handset having two handset charge contacts which are supported by said base and which are placed opposite the receptacle charge contacts when the handset is in said receptacle,
    said front face and back face having a shape which matches a receptacle shape of said receptacle, wherein said receptacle shape matches and completely contacts the shape of the back face.

7. The telephone handset as claimed in claim 6, further comprising means for ensuring a correct biasing of the charge contacts opposite each other, whatever the position of the handset in the receptacle.

8. A telephone handset as claimed in claim 6, wherein the base of said handset has a form that permits of putting said handset on its base either directly on a horizontal support, or in a support that has a shape matching that of said base.

9. A telephone headset and receptacle for the telephone handset,
    said receptacle being positionable between a minimum position and a maximum position relative to the vertical, and having a fixing stop and two receptacle charge contacts,
    and said handset having a front face, a back face, a base and handset charge contacts, and being accommodated in said receptacle in a front face forward or front face backward position, said handset charge contacts and receptacle charge contacts being placed opposite each other, said receptacle having a shape which matches the shapes of the front and back faces of the handset, wherein said receptacle shape completely contacts the shape of the back face,
    said receptacle including fastening means for determining said minimum position, wherein the two receptacle charge contacts are supported by said fixing stop.

10. The receptacle as claimed in claim 9, further comprising means for ensuring a correct biasing of the charge contacts opposite each other whatever the position of the handset in the receptacle.

* * * * *